(12) United States Patent
Ben Ghalba (10) Patent No.: US 10,715,261 B2
(45) Date of Patent: Jul. 14, 2020

(54) METHOD AND APPARATUS FOR ANTENNA ARRAY CALIBRATION USING ON-BOARD RECEIVER

(71) Applicant: Telefonaktiebolaget LM Ericsson (publ), Stockholm (SE)

(72) Inventor: Slim Ben Ghalba, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/303,201

(22) PCT Filed: May 24, 2016

(86) PCT No.: PCT/IB2016/053041
§ 371 (c)(1),
(2) Date: Nov. 20, 2018

(87) PCT Pub. No.: WO2017/203324
PCT Pub. Date: Nov. 30, 2017

(65) Prior Publication Data
US 2020/0007244 A1  Jan. 2, 2020

(51) Int. Cl.
*H04B 17/12* (2015.01)
*H04B 17/10* (2015.01)
(Continued)

(52) U.S. Cl.
CPC ........... *H04B 17/12* (2015.01); *H04B 7/0613* (2013.01); *H04B 17/104* (2015.01); *H04B 17/16* (2015.01);
(Continued)

(58) Field of Classification Search
CPC ...... H04B 17/12; H04B 17/19; H04B 17/104; H04B 17/16; H04B 17/18; H04B 7/0613;
(Continued)

(56) References Cited

U.S. PATENT DOCUMENTS 6,615,024 B1   9/2003   Boros et al.
6,963,742 B2   11/2005  Boros et al.
(Continued)

FOREIGN PATENT DOCUMENTS

CN   1925693 A        3/2007
WO   2003/090386 A1   10/2003
(Continued)

OTHER PUBLICATIONS

International Search Report and Written Opinion dated Jan. 3, 2017 issued in corresponding PCT Application No. PCT/IB2016/053041, consisting of 14 pages.
(Continued)

*Primary Examiner* — Kenneth T Lam
(74) *Attorney, Agent, or Firm* — Sage Patent Group (57) ABSTRACT

A method and apparatus for providing feedback for cancellation of signal impairment in a plurality of separate transmit paths of a transmitter are disclosed. According to one aspect, a method includes receiving a plurality of outbound signals transmitted to the antenna array, the received outbound signals having traversed separate transmit paths of the transmitter. The method also includes converting the plurality of received outbound signals to a corresponding plurality of parallel baseband signals. The corresponding plurality of parallel baseband signals are serialized into a serial feedback signal.

19 Claims, 5 Drawing Sheets

(51) Int. Cl.
  *H04B 17/16* (2015.01)
  *H04B 17/18* (2015.01)
  *H04B 17/19* (2015.01)
  *H04B 7/06* (2006.01)
  *H04L 25/03* (2006.01)

(52) U.S. Cl.
  CPC ............ *H04B 17/18* (2015.01); *H04B 17/19* (2015.01); *H04L 25/03343* (2013.01); *H04L 2025/03356* (2013.01); *H04L 2025/03522* (2013.01)

(58) Field of Classification Search
  CPC .............. H04B 17/14; H04L 25/03343; H04L 2025/03522; H04L 2025/03356; H01Q 1/246; H01Q 3/267
  See application file for complete search history.

(56) References Cited

U.S. PATENT DOCUMENTS

| | | | |
|---|---|---|---|
| 7,106,249 B2 * | 9/2006 | Kubo | H01Q 3/267 342/165 |
| 7,209,078 B2 | 4/2007 | Jin et al. | |
| 7,286,500 B1 | 10/2007 | Bhatoolaul et al. | |
| 7,292,877 B2 | 11/2007 | Yoon et al. | |
| 7,522,847 B2 | 4/2009 | Momtaz et al. | |
| 8,054,891 B2 | 11/2011 | Kim et al. | |
| 8,107,548 B2 | 1/2012 | Jeong et al. | |
| 8,311,166 B2 * | 11/2012 | Kenington | H04B 17/21 370/334 |
| 8,674,874 B2 | 3/2014 | Soualle et al. | |
| 8,929,934 B2 | 1/2015 | Chirayil | |
| 2004/0063469 A1 * | 4/2004 | Kuwahara | H01Q 1/246 455/562.1 |
| 2004/0132414 A1 | 7/2004 | Sendyk et al. | |
| 2004/0142729 A1 * | 7/2004 | Yuda | H01Q 3/267 455/562.1 |
| 2004/0204109 A1 | 10/2004 | Hoppenstein | |
| 2004/0214604 A1 * | 10/2004 | Yoon | H01Q 3/267 455/562.1 |
| 2004/0228417 A1 | 11/2004 | Kennedy et al. | |
| 2005/0207334 A1 | 9/2005 | Hadad | |
| 2005/0219118 A1 | 10/2005 | Kubo et al. | |
| 2005/0239419 A1 * | 10/2005 | Fudaba | H04B 17/12 455/101 |
| 2006/0039459 A1 | 2/2006 | Kolze et al. | |
| 2006/0240784 A1 | 10/2006 | Naguib et al. | |
| 2007/0177620 A1 | 8/2007 | Ohmuro et al. | |
| 2007/0230638 A1 | 10/2007 | Griniasty | |
| 2008/0159357 A1 | 7/2008 | Nekoogar et al. | |
| 2008/0225929 A1 | 9/2008 | Proctor et al. | |
| 2009/0247095 A1 | 10/2009 | Pan | |
| 2010/0048146 A1 | 2/2010 | McCallister | |
| 2011/0148705 A1 * | 6/2011 | Kenington | H03F 3/68 342/372 |
| 2012/0001810 A1 | 1/2012 | Soualle et al. | |
| 2012/0071123 A1 | 3/2012 | Jones et al. | |
| 2012/0147991 A1 | 6/2012 | Matsubara et al. | |
| 2014/0133470 A1 * | 5/2014 | McGowan | H04W 72/082 370/336 |
| 2014/0133543 A1 * | 5/2014 | Da Silveira | H04L 25/03949 375/232 |
| 2014/0292579 A1 * | 10/2014 | Oh | H01Q 3/38 342/372 |
| 2015/0215951 A1 | 7/2015 | McGowan et al. | |

FOREIGN PATENT DOCUMENTS

| | | |
|---|---|---|
| WO | 2010/038227 A2 | 4/2010 |
| WO | 2014/076630 A1 | 5/2014 |
| WO | 2014/076631 A1 | 5/2014 |
| WO | 2015/066883 A1 | 5/2015 |

OTHER PUBLICATIONS

Anonymous: "Multiplexing" Wikipedia, May 15, 2016, XP055336976, Retrieved from the Internet; consisting of 11 pages.

International Search Report and Written Opinion of the International Searching Authority dated Aug. 1, 2016 issued in PCT Application No. PCT/IB2015/058800, consisting of 12 pages.

Notice of Allowance from related U.S. Appl. No. 13/677,781 dated Jan. 30, 2015, consisting of 15 pages.

Notice of Allowance from related U.S. Appl. No. 13/894,826 dated Mar. 19, 2015, consisting of 7 pages.

Non-Final Office Action from related U.S. Appl. No. 13/677,781 dated Aug. 13, 2014, consisting of 18 pages.

Non-Final Office Action from related U.S. Appl. No. 13/894,826 dated Dec. 1, 2014, consisting of 10 pages.

International Preliminary Report on Patentability dated May 19, 2015 issued in related PCT Application No. PCT/IB2013/060066, consisting of 6 pages.

International Preliminary Report on Patentability dated May 19, 2015 issued in related PCT Application No. PCT/IB2013/060067, consisting of 6 pages.

International Search Report and Written Opinion of the International Searching Authority dated Jan. 23, 2014 issued in related PCT Application No. PCT/IB2013/060066, consisting of 9 pages.

International Search Report and Written Opinion of the International Searching Authority dated Jan. 23, 2014 issued in related PCT Application No. PCT/IB2013/060067, consisting of 9 pages.

First Office Action from related Chinese Application No. 201380059926.1, dated Dec. 24, 2015, consisting of 11 pages.

Second Office Action from related Chinese Application No. 201380059926.1, dated May 24, 2016, consisting of 11 pages.

* cited by examiner

METHOD AND APPARATUS FOR ANTENNA ARRAY CALIBRATION USING ON-BOARD RECEIVER

CROSS-REFERENCE TO RELATED APPLICATIONS

This application is a Submission Under 35 U.S.C. § 371 for U.S. National Stage Patent Application of International Application Number: PCT/IB2016/053041, filed May 24, 2016 entitled "METHOD AND APPARATUS FOR ANTENNA ARRAY CALIBRATION USING ON-BOARD RECEIVER," the entirety of which is incorporated herein by reference.

TECHNICAL FIELD

This disclosure relates to wireless communication and in particular, calibration of transmit paths in a radio transmitter.

BACKGROUND

Antenna arrays have been widely used in wireless mobile networks for directional signal transmission and reception with an increased gain compared to an omni-directional antenna. The increased gain translates into a higher cell density and data throughput. An antenna array needs to be calibrated across its sub-array paths to remove any linear phase and/or amplitude distortions in these paths. If the transmission beam pattern is out of phase or otherwise phase-distorted, the signal transmitted by a base station at normal transmission power may not be correctly received and decoded by a wireless device. To compensate for the phase distortions, the base station may transmit data at a higher power level. However, increasing the transmission power acts as a load to the system, causing a reduction to the power that can be allocated to other wireless devices. In addition, the signal transmitted at higher power may interfere with other wireless devices, causing a reduction in signal quality.

One existing method for antenna array calibration uses special calibration signals injected into the transmit path of the base station. The special calibration signals may interrupt and/or degrade the normal outbound traffic signals, which can negatively impact the network capacity and data throughput. Additionally, there are currently a wide variety of base stations that have different system configurations to support multiple communications standards and multiple carriers. The use of the special calibration signals by these base stations may result in standards non-compliance and/or violate regulatory requirements.

Further, phase variations, such as distortions, may be caused by impairments introduced by use of separate timing or clock components in each of different transmit chains, for example different radio frequency local oscillators, voltage controlled crystal oscillators, clock recovery phased locked loops, etc. Each transmit chain lies in a transmit path that extends from an input signal port to a subarray element. The rapid nature of these impairments require correction at a fast rate, a requirement conventional solutions cannot easily meet because of their complexity and processing requirements.

Problems with known solutions to the problem of correcting impairment in transmit paths of a radio transmitter include a requirement to introduce dithering in highly correlated signals, failure of the known solutions to linearly scale with the number of elements of the antenna arrays, need for a special calibration port built into the radio unit of the transmitter, and sharing the receiver in the radio unit to process feedback signals used to estimate impairment.

SUMMARY

Some embodiments advantageously provide a method and apparatus for providing feedback for cancellation of impairment in a plurality of separate transmit paths of a transmitter. According to one aspect, a method includes receiving a plurality of outbound signals transmitted to the antenna array, the received outbound signals having traversed separate transmit paths of the transmitter. The method also includes converting the plurality of received outbound signals to a corresponding plurality of parallel baseband signals. The corresponding plurality of parallel baseband signals are serialized into a serial feedback signal.

According to this aspect, in some embodiments, the converting to baseband signals comprises sampling and demodulating the plurality of outbound signals. Some embodiments further include transmitting the serial feedback signal to a radio unit. In some embodiments, transmitting of the serial feedback signal is in response to a request from the radio unit. In some embodiments, the plurality of baseband signals are time domain baseband signals, and the method further includes transforming the plurality of time domain baseband signals to a corresponding plurality of parallel frequency domain signals before serializing the corresponding plurality of time domain baseband signals into a serial feedback signal. In some embodiments, the transforming is Fourier transforming implemented as computing hardware. In some embodiments, the number of antenna ports exceeds eight and the number of outbound signals processed by the feedback processor exceed eight there being a one-to-one correspondence between the number of antenna ports and the number of outbound signals processed by the feedback processor. In some embodiments, the number of antenna ports exceeds sixteen and the number of outbound signals processed by the feedback processor exceed sixteen there being a one-to-one correspondence between the number of antenna ports and the number of outbound signals processed by the feedback processor.

According to another aspect, a feedback processor for use with an antenna array is provided. The feedback processor is configured to receive outbound signals at the antenna array, the antenna array having a plurality of antennas. The feedback processor includes a plurality of inputs, each input configured to receive an outbound signal of a plurality of outbound signals separately transmitted to a corresponding antenna of the plurality of antennas. The feedback processor also includes a radio frequency (RF) to baseband converter configured to convert the plurality of outbound signals to a corresponding plurality of baseband signals. The feedback processor also includes a parallel to serial converter configured to serialize the corresponding plurality of parallel baseband signals into a serial feedback signal.

According to this aspect, in some embodiments, the converting to baseband signals comprises sampling and demodulating the plurality of outbound signals. Some embodiments further include transmitting the serial feedback signal to a radio unit. In some embodiments, transmitting of the serial feedback signal is in response to a request from the radio unit. In some embodiments, the plurality of baseband signals are time domain baseband signals, and the feedback processor further includes a transformer configured to transform the plurality of time domain baseband signals to a corresponding plurality of parallel frequency domain signals before serializing the corresponding plurality of time domain baseband signals into a serial feedback signal. In some embodiments, the transformer is a Fourier transformer implemented as computing hardware. In some embodiments, the number of antenna ports exceeds eight and the number of outbound signals processed by the feedback processor exceed eight, there being a one-to-one correspondence between the number of antenna ports and the number of outbound signals processed by the feedback processor. In some embodiments, the number of antenna ports exceeds sixteen and the number of outbound signals processed by the feedback processor exceed sixteen, there being a one-to-one correspondence between the number of antenna ports and the number of outbound signals processed by the feedback processor.

According to another aspect, a calibration method to compensate for signal impairment in a plurality of separate transmit paths in a transmitter is provided. The transmitter has a radio unit configured to receive outbound signals and transmit the outbound signals to an antenna array via a separate transmit path for each outbound signal. The antenna array includes a feedback processor. The method includes receiving at the antenna array, a plurality of the outbound signals after each outbound signal traverses a respective separate transmit path. The method includes deriving a plurality of feedback signals from the corresponding received outbound signals, the method also includes serializing the plurality of feedback signals into a serial feedback signal. The method also includes transmitting the serial feedback signal from the feedback processor to the radio unit. The method further includes converting, at the radio unit, the serial feedback signal into a plurality of parallel feedback signals, each parallel feedback signal corresponding to one of the derived feedback signals from the plurality of outbound signals. For each transmit path, the method includes capturing an outbound signal received by the transmitter as a reference signal before the outbound signal is input to a transmit path of the radio unit, computing an impairment value of the transmit path of the corresponding outbound signal based on the corresponding reference signal and a corresponding parallel feedback signal, and correcting an impairment of the transmit path by applying the impairment value to the outbound signal before the outbound signal traverses the transmit path.

According to this aspect, the impairment value of each transmit path is computed as a ratio of the corresponding parallel feedback signal to the corresponding reference signal. In some embodiments, for each transmit path, the impairment is corrected by multiplying the outbound signal by the corresponding impairment value before the outbound signal is input to the transmit path. In some embodiments, for each transmit path, the captured outbound signal is captured after the corresponding impairment value is applied to the outbound signal but before the outbound signal traverses the transmit path. In some embodiments, the deriving of the plurality of feedback signals comprises sampling and demodulating the received outbound signals and transform the sampled demodulated received outbound signals to a frequency domain. In some embodiments, the transmitting of the serial feedback signal is performed in response to a request from the radio unit.

According to yet another aspect, a radio is configured to compensate for signal impairment in separate transmit paths of the transmitter and to drive an antenna array. The radio includes a feedback processor coupled to ports of the antenna array and configured to derive a plurality of feedback signals from outbound signals that have traversed their respective separate transmit paths. The feedback processor is also configured to serialize the plurality of feedback signals into a serial feedback signal and to transmit the serial feedback signal from the feedback processor to a radio unit. The radio also includes a radio unit configured to receive a plurality of outbound signals, route the plurality of outbound signals to the transmit paths, capture the outbound signals before the outbound signals are submitted to the transmit paths to provide reference signals corresponding to the transmit paths and receive the serial feedback signal from the receiver. The radio unit is also configured to convert the serial feedback signals to a plurality of parallel feedback signals, each parallel feedback signal corresponding to a derived feedback signal from the plurality of outbound signals. For each transmit path, the radio unit is configured to compute an impairment value for each transmit path based on a parallel feedback signal corresponding to the path and a reference signal corresponding to the path, and to correct an impairment of each transmit path by applying the impairment value for the transmit path to an outbound signal before the outbound signal traverses the transmit path.

According to this aspect, in some embodiments, the impairment value of a transmit path is computed as a ratio of the corresponding parallel feedback signal to the corresponding reference signal. In some embodiments, the impairment of a transmit path is corrected by multiplying the corresponding outbound signal by the impairment value before the corresponding outbound signal is input to the transmit path. In some embodiments, the captured outbound signals are captured after the impairment values are applied to the outbound signals. In some embodiments, the deriving the plurality of feedback signals comprises sampling and demodulating the outbound signals and transforming the sampled demodulated outbound signals to a frequency domain. In some embodiments, the transmitting of the serial feedback signal is performed in response to a request from the radio unit.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to calibration of transmit paths in a radio transmitter. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In order for calibration to be practical, meeting a number of criteria may be of value. First, calibration should use live traffic signals. Second, the number of radio to antenna interconnects should be kept at a minimum to allow a small form factor of the radio. Third, calibration should be done in real-time. Fourth, calibration should be scalable to a large number of antenna sub-arrays without impacting the accuracy of the calibration. Fifth, digital processing should be kept at a minimum to allow antenna calibration to be performed alongside other tasks in the radio without using excess resources.

Embodiments provide an antenna array calibration method that uses normal outbound traffic signals for calibration. The term "outbound traffic signals" as used herein refers to the traffic signals that are to be wirelessly transmitted from the antenna array to other network nodes or wireless devices.

In some embodiments, a non-limiting term "wireless device" is used. The wireless device 12 herein can be any type of wireless device capable of communicating with network entity 14 or another wireless device 12 such as user equipment (UE) over radio signals. The wireless device 12 may also be radio communication device, target device, device to device (D2D) wireless device, machine type wireless device or wireless device capable of machine to machine communication (M2M), a sensor equipped with wireless device, iPAD, Tablet, mobile terminals, smart phone, laptop embedded equipped (LEE), laptop mounted equipment (LME), USB dongles, Customer Premises Equipment (CPE), etc.

The method described herein calibrates the antenna array in the transmit direction. The method does not use or require any special calibration signal injected into the base station. Because normal outbound traffic signals are used for calibration, the calibration does not interrupt or interfere with the ongoing traffic signals, and therefore does not impact system availability and signal quality. In addition, because the calibration does not incur interruption of normal system operation, the calibration can be performed at all times to account for changes in operating conditions such as temperature changes.

In some embodiments, the calibration can be performed entirely within the radio unit of a base station using the feedback signal from the antenna module, without involving other parts of the base station and the network. Confining the calibration within the radio unit can simplify the hardware and software design and lower the cost of the system as compared with known systems. Moreover, the radio unit in a base station is typically multi-standard, which also means that the radio unit is agnostic to the specific radio standard (i.e., Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. However, it is to be appreciated that embodiments are not so limited.

In some embodiments, the calibration can be performed by the radio unit and other parts of the base station, such as the baseband unit. However, the digital circuitry in the baseband unit is generally multi-standard in hardware, but typically uses software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit.

In some embodiments, feedback signals used for calibration of impairments of transmit paths in a transmitter that drives multiple antenna elements of an antenna array are obtained via of a feedback processor located at the antenna array. The feedback processor may be implemented using an off-the-shelf receiver. The feedback processor samples the radio frequency (RF) outbound signals input to the antenna elements after the outbound signals have traversed a transmit path. Note that the feedback processor may linearly scale with an increase in the number of antenna elements. The sampled RF outbound signals are converted to baseband by the feedback processor to produce a plurality of feedback signals in parallel, one feedback signal for each transmit path. In some embodiments, the feedback processor transforms the feedback signals to a frequency domain. This may be done by using dedicated Fast Fourier Transform (FFT) circuitry. The parallel transformed feedback signals are then serialized to produce a serial feedback signal that is transmitted to the radio unit of the transmitter.

In some embodiments, the radio unit receives the serial feedback signal and converts the serial feedback signal to a plurality of parallel feedback signals, one for each transmit path. Simultaneously, in the radio unit, the outbound signals are individually captured before the outbound signals traverse their respective transmit paths to produce a reference signal for each transmit path. An impairment value for each transmit path is computed based on the feedback signal corresponding to the transmit path and the corresponding reference signal. The impairment value for each path is multiplied by the corresponding outbound signal to correct for impairment introduced by the transmit path. Because there is a one to one relationship between the feedback signals and the reference signals, more complicated procedures for impairment estimation are not required, thereby conserving resources.

Figure 1:
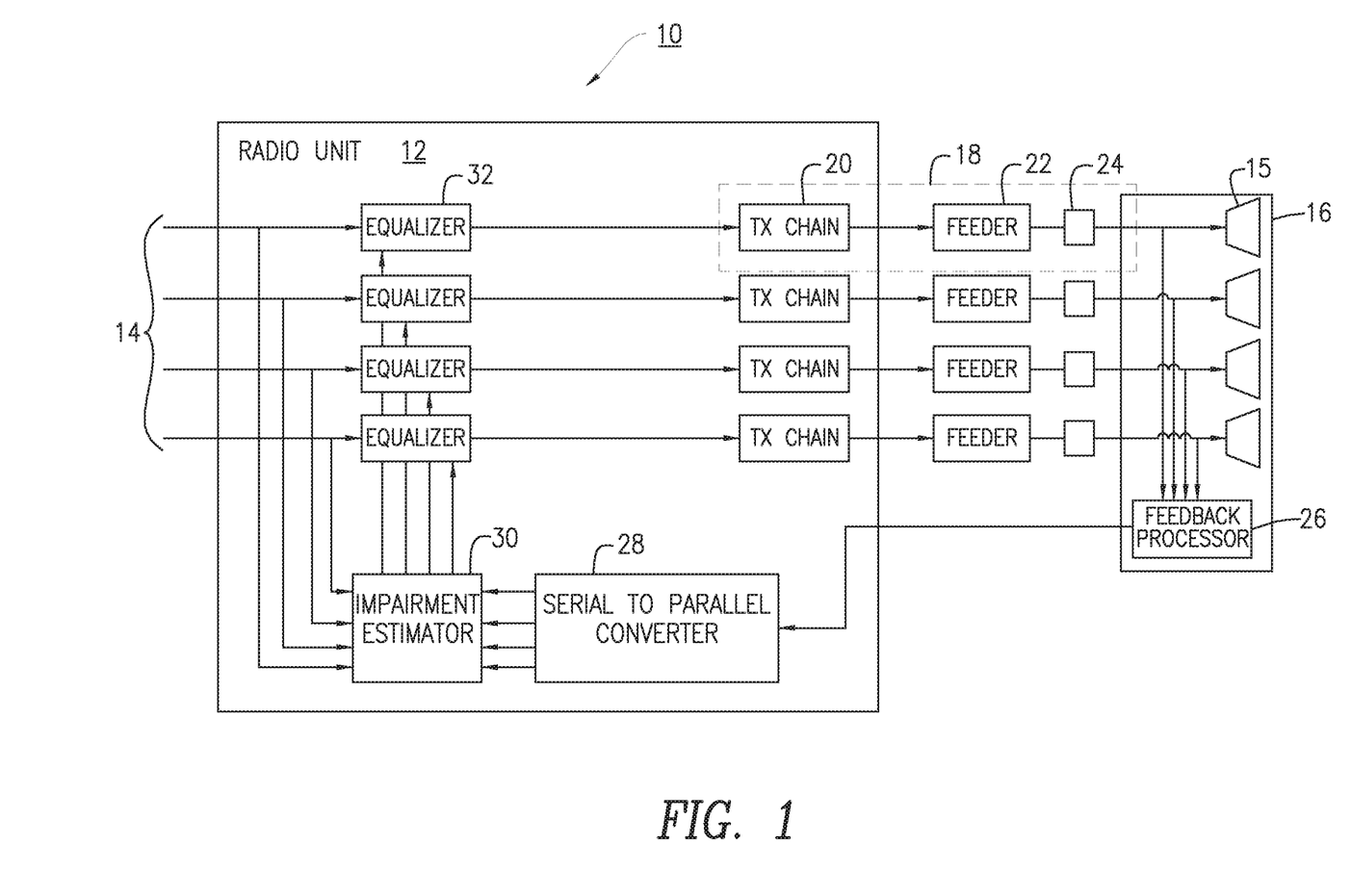
FIG. 1 is a block diagram of a transmitter constructed in accordance with principles discussed herein.

FIG. 1 is a block diagram of a transmitter 10 that incorporates and implements the features herein described. The transmitter 10 includes a radio unit 12 that includes a plurality of signal paths 14 that receive outbound traffic signals. The outbound traffic signals may include voice and data. Although four paths are shown, fewer paths or more paths may be implemented. In particular, there may be one signal path for each antenna element 15 of an antenna array 16. The antenna array may have two, four, eight, sixteen or any other number of antenna elements with each antenna element being separately fed the outbound signals. Note that in some embodiments there is a one to one correspondence between the signal paths and the antenna elements.

The antenna elements of the antenna array 16 radiate the outbound signals over the air after each outbound signal traverses a transmit path 18. The transmit path 18 includes a transmit chain 20, a feeder 22 and an antenna port 24. The transmit chain 20 may include (but are not shown in order to aid understanding of the embodiment) a digital to analog converter, a modulator, an up-converter, a power amplifier, digital pre-distortion circuitry, and other elements commonly found in the transmit chain of a radio transmitter. The feeder 22 may include a strip line, micro-strip, coaxial cable or transmission line that couples the outbound signal from the radio unit to the antenna port 24. The antenna elements 15 of the antenna array 16 may be connected to the antenna ports 24 via directional couplers, for example, (not shown). Each directional coupler couples a portion of the outbound signal energy to the antenna element and couples a portion of the outbound signal energy to a feedback processor 26. The outbound signal energy in each path is the energy of the outbound signal of the path after the outbound signal traverses the transmit path 18.

The feedback processor 26 samples, for each path, the RF signal energy coupled by the directional coupler to the feedback processor 26 and converts the sampled RF signal for each path to a baseband signal. In some embodiments, the conversion to baseband includes sampling the RF signals and demodulating the RF signals. The baseband signals for each path are optionally transformed into the frequency domain within the feedback processor 26 to produce parallel transformed feedback signals. The transformation could be a fast Fourier transform implemented in hardware.

The feedback processor 26 serializes the parallel transformed feedback signals to produce a serial feedback signal that is transmitted to serial to parallel converter 28. In some embodiments, the transmitting of the serial feedback signal is in response to a request from the radio unit 12 to the feedback processor 26. Note that there is a one to one correspondence between the outbound signals and the feedback signals. By serializing the transformed parallel feedback signals into a single serial feedback signal, only one port is required to be included in the radio unit 12 to receive the feedback signals. The port that receives the serial feedback signal may be a port that already exists in the radio unit 12 and that may be used for other purposes, as well.

In some embodiments, the feedback processor is located on the same physical fixture as the antenna elements 15 of the antenna array 16, i.e., within the antenna array 16. For example, in some embodiments, the feedback processor 26 is on a circuit board that also includes the directional couplers. In some embodiments, the feedback processor 26 is in on a separate circuit board in proximity to the antenna array 16 and separate from the radio unit 12.

Note that the feedback processor 26 scales linearly with the number of outbound signals. Thus, there may be as many traffic signal paths and as many antenna elements as desired, for example, sixteen or more, with an additional channel of the feedback processor for each additional signal path/antenna element.

The serial to parallel converter 28 converts the serial feedback signal to one parallel feedback signal for each transmit path 18. The parallel feedback signals output by the serial to parallel converter 28 is input to an impairment estimator 30. The impairment estimator 30 also receives the outbound signals captured from the signal paths 14 to produce a set of reference signals. Note that there is a one to one correspondence between the reference signals and the feedback signals.

Using a parallel feedback signal corresponding to an $p^{th}$ transmit path and using the captured outbound signal corresponding to that transmit path as a reference signal, the impairment estimator 30 computes an impairment value. For example, the impairment value $H_d(p)$ for a path p may be computed as the ratio of the feedback signal for the path, $S_F(p)$ to the reference signal for the path, $S_R(p)$, as follows:

$$H_d(p) = \frac{S_F(p)}{S_R(p) \cdot H(p)}$$

Where H(p) is the inverse of the current value present in Equalizer of path p. The idea here is to undo the effect of the equalizer in the path p as the equalizer is inside the calibration loop.

The impairment value $H_d(p)$ for a path p is fed to an equalizer 32 in the $p^{th}$ path. The impairment estimation for N signal paths is given by:

$$H_d = \begin{bmatrix} H_d(1) \\ H_d(2) \\ H_d(3) \\ H_d(4) \\ \vdots \\ H_d(N) \end{bmatrix}$$

Since there is a one to one correspondence between the reference signals and the feedback signals, matrix operation is not required, thereby resulting in far less complexity than configurations that require matrix operations. In one embodiment, the impairment estimator can be implemented in application specific integrated circuitry or a programmed processor. In some embodiments, each equalizer 32 multiplies the outbound signal in the path of the equalizer by the impairment value to correct for impairment introduced to the outbound signal by the respective transmit path 28.

Figure 2:
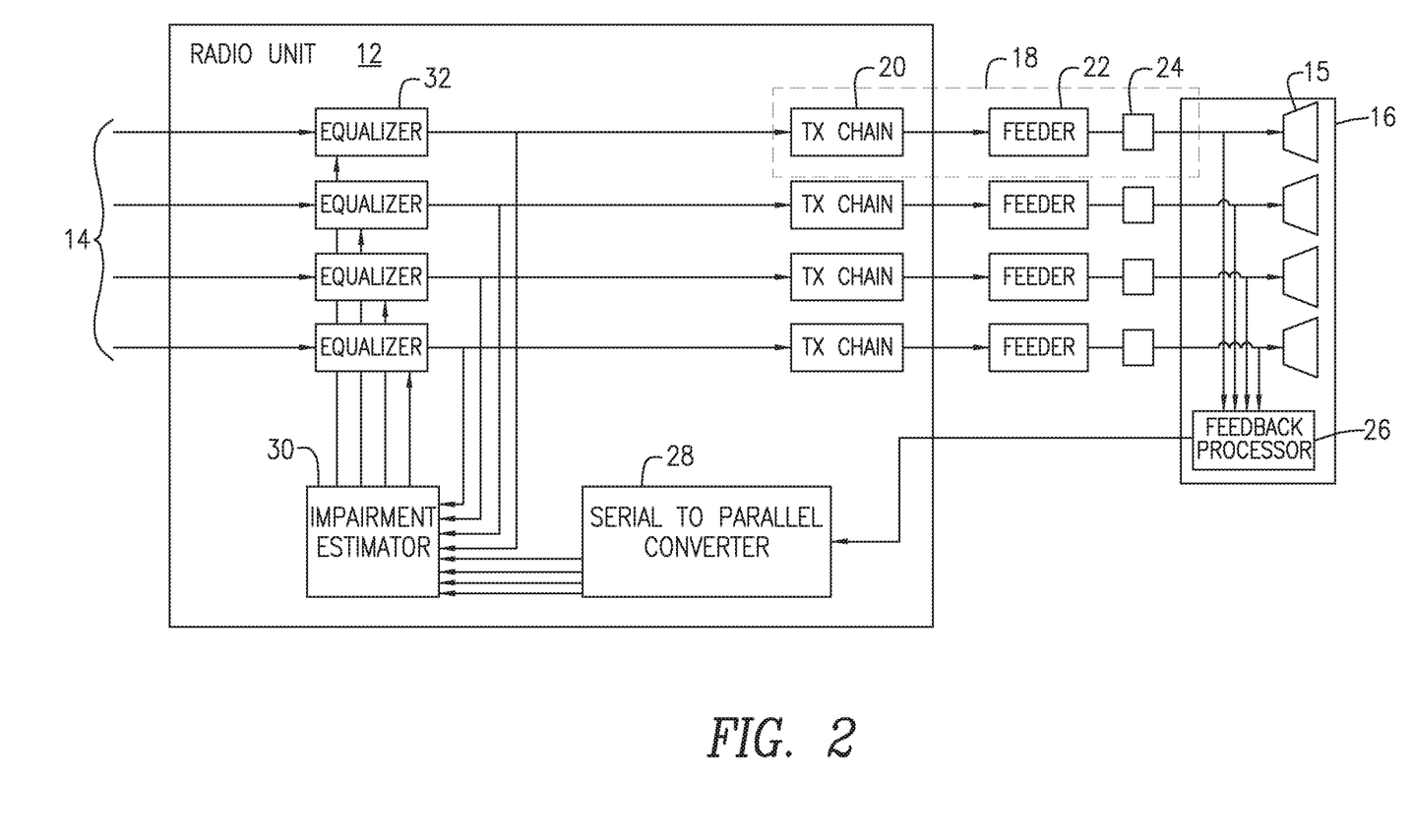
FIG. 2 is a block diagram of an alternative embodiment of a transmitter constructed in accordance with principles herein.

FIG. 2 shows the radio transmitter 10 with a slightly different configuration where the outbound signals used for reference signals are captured after they traverse the equalizer 32. In this case, the impairment estimator may compute the impairment value $H_d(p)$ as follows:

$$H_d(p) = \frac{S_F(p)}{S_R(p)}$$

An advantage to the configuration of FIG. 2 over the configuration of FIG. 1 is the reduced computational complexity of computing the impairment values.

Figure 3:
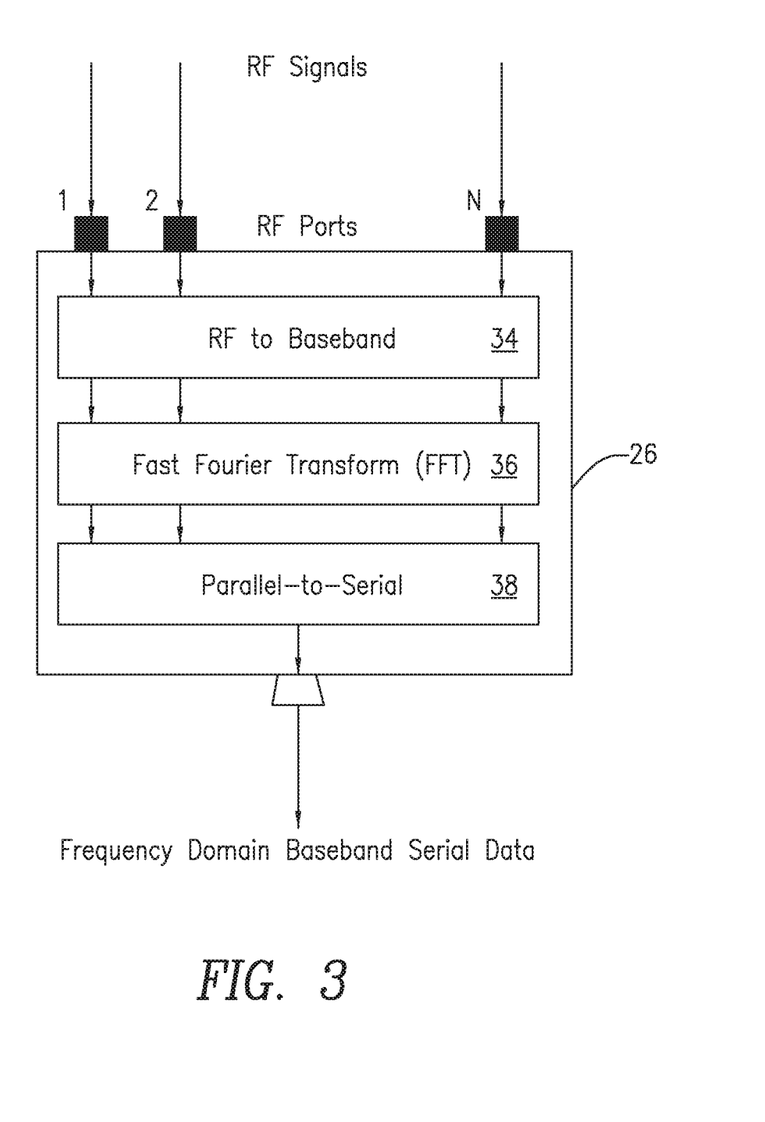
FIG. 3 is a block diagram of a feedback processor constructed in accordance with principles discussed herein.

FIG. 3 is a block diagram of an embodiment of the feedback processor 26. The feedback processor 26 includes an RF to baseband converter 34, a fast Fourier transformer 36 and a parallel to serial converter 38. The RF to baseband converter 34 is configured to convert the received outbound RF signals to baseband signals. The fast Fourier transformer 36 is configured to transform the plurality of baseband signals to a corresponding plurality of parallel frequency domain signals. The parallel to serial converter 38 is configured to serialize the plurality of parallel frequency domain signals to produce a serial feedback signal. The serial feedback signal is communicated to the serial to parallel converter 28 of the radio unit 12. In some embodiments, the transformation to the frequency domain may be omitted, with the implementation of the feedback processor 26 being performed entirely in the time domain and where conversion to the frequency domain occurs in the radio unit 12.

Figure 4:
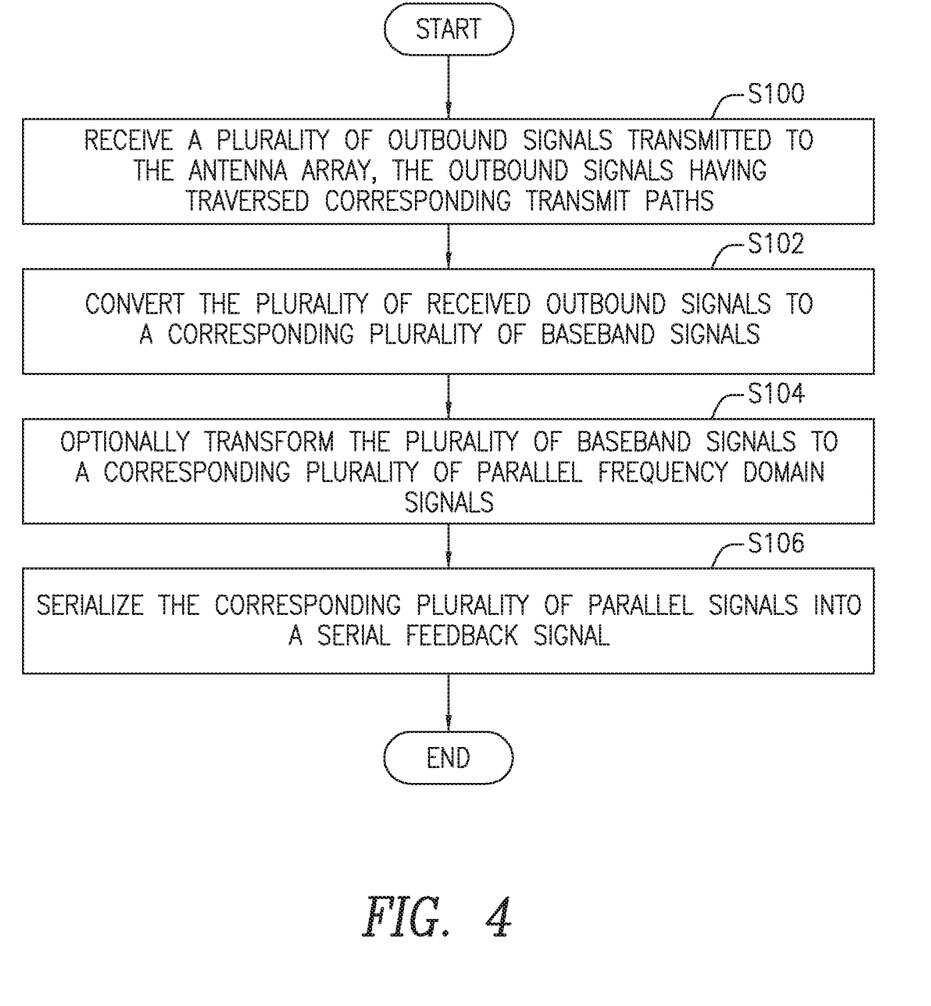
FIG. 4 is a flowchart of an exemplary process for preparing feedback signals used to correct for transmit path impairment.

FIG. 4 is a flowchart of an exemplary process implemented by the feedback processor 26. The process includes receiving a plurality of outbound RF signals transmitted to an antenna array, the outbound signals having traversed separate corresponding transmit paths (block S100). The plurality of received outbound signals are converted to a corresponding plurality of baseband signals by the RF to baseband converter 34 (block S102). The plurality of baseband signals are transformed to a corresponding plurality of parallel frequency domain signals by the Fourier transformer 36 (block S104). The transformation may be a Fourier transformation or other transformation, such as a cosine transformation, for example. In one embodiment, the baseband signals are time domain signals. The plurality of parallel frequency domain signals are serialized to produce a serial feedback signal by the parallel to serial converter 38 (block S106). The serial feedback signal is transmitted to the radio unit 12 (block S108).

Figure 5:
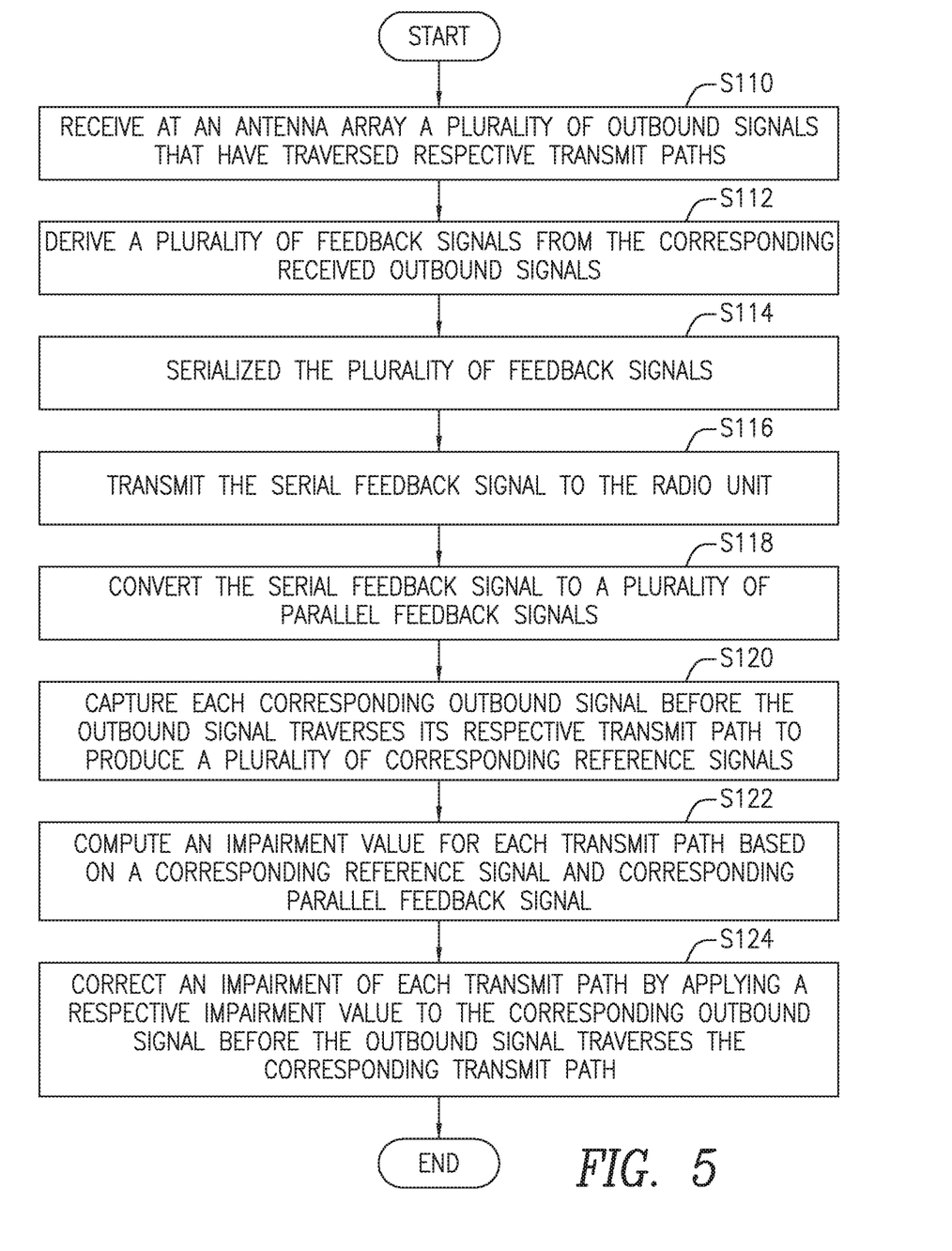
FIG. 5 is a flowchart of an exemplary process for correcting for transmit path impairment.

FIG. 5 is a flowchart of an exemplary process to compensate for signal impairment in a plurality of separate transmit paths in a transmitter, the transmitter having a radio unit 12 configured to receive outbound signals and transmit the outbound signal to an antenna array via a separate transmit path 18 for each outbound signal. The process includes receiving at a feedback processor 26 at the antenna array, a plurality of the outbound signals after each outbound signal traverses a respective separate transmit path 18 (block S110). A plurality of feedback signals are derived from corresponding received outbound signals (block S112). The plurality of feedback signals are serialized to produce a serial feedback signal by the feedback processor 26 (block S114). The serial feedback signal is transmitted to the radio unit 12 of the transmitter 10 (block S116). In the radio unit 12, the serial feedback signal is converted to parallel feedback signals by a serial to parallel converter 28 (block S118). Simultaneously, outbound signals are captured before the outbound signals traverse the transmit paths 18, to produce a plurality of corresponding reference signals (block S120). An impairment value is computed for each transmit path 18 by an impairment estimator 30 based on a corresponding reference signal and corresponding parallel feedback signal (block S122). An impairment of each transmit path is corrected by applying a respective impairment value from the impairment estimator 30 in each equalizer 32 to the corresponding outbound signal before the outbound signal traverses the transmit path (block S124).

Some embodiments provide impairment compensation that does not depend on whether the signals in the signal paths are highly correlated or uncorrelated. Thus, there is no need for signal conditioning in the radio that might impact error vector magnitude and that might impact beam wobbling. Nor is there a need for a dedicated calibration port in the radio unit so that the design of the radio is kept relatively simple. Further, there is no need to use the receiver in the radio, thus freeing up this resource for other tasks. Also, using a hardware-implemented fast Fourier transform (FFT) in the feedback processor results in much faster processing than using a software based FFT in the radio unit. In addition, unlike some conventional methods which are limited to eight antenna elements, the techniques described herein are scalable for handling large numbers of antenna elements and subarrays. The signal processing described herein is simple since impairment is estimated on a one-to-one basis, which also results in greater accuracy. Further, use of an off the shelf receiver to implement the feedback receiver allows for lower cost than some conventional methods.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a feedback processor at an antenna array for obtaining feedback signals to compensate for signal impairment in a plurality of separate transmit paths of a transmitter, the method comprising:
   receiving a plurality of outbound signals transmitted to the antenna array, the received outbound signals having traversed separate transmit paths of the transmitter;
   converting the plurality of received outbound signals to a corresponding plurality of parallel baseband signals, wherein the plurality of parallel baseband signals are time domain baseband signals;
   transforming the plurality of time domain baseband signals to a corresponding plurality of parallel frequency domain signals;
   after transforming the plurality of time domain baseband signals, serializing the corresponding plurality of parallel baseband signals into a serial feedback signal; and
   converting the serial feedback signal into a plurality of parallel feedback signals, each parallel feedback signal corresponding to one of the derived feedback signals from the plurality of outbound signals.

2. The method of claim 1, wherein the converting to the corresponding plurality of baseband signals comprises sampling and demodulating the plurality of outbound signals.

3. The method of claim 1, further comprising transmitting the serial feedback signal to a radio unit.

4. The method of claim 3, wherein the transmitting of the serial feedback signal is in response to a request from the radio unit.

5. The method of claim 1, wherein the transforming is Fourier transforming implemented as computing hardware.

6. The method of claim 1, wherein a number of antenna ports exceeds eight and a number of outbound signals processed by the feedback processor exceed eight there being a one-to-one correspondence between the number of antenna ports and the number of outbound signals processed by the feedback processor.

7. The method of claim 1, wherein a number of antenna ports exceeds sixteen and a number of outbound signals processed by the feedback processor exceed sixteen there being a one-to-one correspondence between the number of antenna ports and the number of outbound signals processed by the feedback processor.

8. A feedback processor for use with an antenna array, the feedback processor configured to receive outbound signals at the antenna array, the antenna array having a plurality of antennas, the feedback processor comprising:
   a plurality of inputs, each input configured to receive an outbound signal of a plurality of outbound signals separately transmitted to a corresponding antenna of the plurality of antennas;
   a radio frequency (RF) to baseband converter configured to convert the plurality of outbound signals to a corresponding plurality of baseband signals, wherein the plurality of baseband signals are time domain baseband signals;
   a fast fourier transformer (FFT) configured to transform the plurality of time domain baseband signals to a corresponding plurality of parallel frequency domain signals;
   a parallel to serial converter configured to serialize the corresponding plurality of parallel baseband signals into a serial feedback signal after the FFT transforming the plurality of time domain baseband signals; and
   a serial to parallel converter configured to convert the serial feedback signal into a plurality of parallel feedback signals, each parallel feedback signal corresponding to one of the derived feedback signals from the plurality of outbound signals.

9. The feedback processor of claim 8, wherein the converting to baseband signals comprises sampling and demodulating the plurality of outbound signals.

10. The feedback processor of claim 8, further comprising transmitting the serial feedback signal to a radio unit.

11. The feedback processor of claim 10, wherein the transmitting of the serial feedback signal is in response to a request from the radio unit.

12. A calibration method to compensate for signal impairment in a plurality of separate transmit paths in a transmitter, the transmitter having a radio unit configured to receive outbound signals and transmit the outbound signals to an antenna array via a separate transmit path for each outbound signal, the antenna array including a feedback processor, the method comprising:
   receiving at the antenna array, a plurality of the outbound signals after each outbound signal traverses a respective separate transmit path;
   deriving a plurality of feedback signals from the corresponding received outbound signals;
   converting the plurality of outbound signals into a corresponding plurality of baseband signals, wherein the plurality of baseband signals are time domain baseband signals;
   transforming the plurality of time domain baseband signals to a corresponding plurality of parallel frequency domain signals;
   after transforming the plurality of time domain baseband signals, serializing the plurality of feedback signals into a serial feedback signal;
   transmitting the serial feedback signal from the feedback processor to the radio unit; and
   converting, at the radio unit, the serial feedback signal into a plurality of parallel feedback signals, each parallel feedback signal corresponding to one of the derived feedback signals from the plurality of outbound signals; and
   for each transmit path:
     capturing an outbound signal received by the transmitter as a reference signal before the outbound signal is input to a transmit path of the radio unit;

computing an impairment value of the transmit path of the corresponding outbound signal based on the corresponding reference signal and a corresponding parallel feedback signal; and correcting an impairment of the transmit path by applying the impairment value to the outbound signal before the outbound signal traverses the transmit path.

13. The method of claim 12, wherein the impairment value of each transmit path is computed as a ratio of the corresponding parallel feedback signal to the corresponding reference signal.

14. The method of claim 12, wherein, for each transmit path, the impairment is corrected by multiplying the outbound signal by the corresponding impairment value before the outbound signal is input to the transmit path.

15. The method of claim 12, wherein, for each transmit path, the captured outbound signal is captured after the corresponding impairment value is applied to the outbound signal but before the outbound signal traverses the transmit path.

16. The method of claim 12, wherein the deriving of the plurality of feedback signals comprises sampling and demodulating the received outbound signals and transforming the sampled demodulated received outbound signals to a frequency domain.

17. The method of claim 12, wherein the transmitting of the serial feedback signal is performed in response to a request from the radio unit.

18. A radio configured to compensate for signal impairment in separate transmit paths of the transmitter and to drive an antenna array, the radio comprising:
    a feedback processor coupled to ports of the antenna array and configured to:
        derive a plurality of feedback signals from outbound signals that have traversed their respective separate transmit paths;
        convert a plurality of outbound signals into a corresponding plurality of baseband signals, wherein the plurality of baseband signals are time domain baseband signals;
        transform the plurality of time domain baseband signals to a corresponding plurality of parallel frequency domain signals;
        serialize the plurality of feedback signals into a serial feedback signal after transforming the plurality of time domain baseband signals; and
        transmit the serial feedback signal from the feedback processor to a radio unit; and
    a transmitter comprising a plurality of signal paths configured to:
        receive a plurality of outbound signals;
        route the plurality of outbound signals to the transmit paths;
        capture the outbound signals before the outbound signals are submitted to the transmit paths to provide reference signals corresponding to the transmit paths;
        receive the serial feedback signal from the feedback processor;
        convert the serial feedback signals to a plurality of parallel feedback signals, each parallel feedback signal corresponding to a derived feedback signal from the plurality of outbound signals; and
    for each transmit path:
        compute an impairment value for each transmit path based on a parallel feedback signal corresponding to the path and a reference signal corresponding to the path; and
        correct an impairment of each transmit path by applying the impairment value for the transmit path to an outbound signal before the outbound signal traverses the transmit path.

19. The radio of claim 18, wherein the impairment value of a transmit path is computed as a ratio of the corresponding parallel feedback signal to the corresponding reference signal.

* * * * *